(12) United States Patent
Palmer et al.

(10) Patent No.: US 10,431,055 B2
(45) Date of Patent: Oct. 1, 2019

(54) BATTERY INTERCONNECTED ALERT DEVICE SYSTEM WITH VIBRATIONAL ALERT

(71) Applicant: Vireo Tech, LLC, Gilbert, AZ (US)

(72) Inventors: Preston Palmer, Gilbert, AZ (US); Wesley Palmer, Mesa, AZ (US); Larkin Palmer, Payson, AZ (US)

(73) Assignee: Vireo Tech, LLC, Gilbert, AZ (US)

( * ) Notice: Subject to any disclaimer, the term of this patent is extended or adjusted under 35 U.S.C. 154(b) by 623 days.

(21) Appl. No.: 15/081,767

(22) Filed: Mar. 25, 2016

(65) Prior Publication Data

US 2016/0210825 A1 Jul. 21, 2016

Related U.S. Application Data

(63) Continuation-in-part of application No. 14/557,362, filed on Dec. 1, 2014, now Pat. No. 9,966,791, which
(Continued)

(51) Int. Cl.
*G08B 1/00* (2006.01)
*G01C 21/36* (2006.01)
(Continued)

(52) U.S. Cl.
CPC .............. *G08B 6/00* (2013.01); *G08B 21/14* (2013.01); *G08B 29/181* (2013.01); *H02J 3/02* (2013.01);
(Continued)

(58) Field of Classification Search
CPC ........ G08B 6/00; G08B 21/14; G08B 29/181; G08B 13/00; G08B 17/10; H02J 3/02;
(Continued)

(56) References Cited

U.S. PATENT DOCUMENTS 3,644,912 A  2/1972 Allen
4,199,754 A  4/1980 Johnson et al.
(Continued)

OTHER PUBLICATIONS

ISR for PCT/US2015/061957 completed Jan. 7, 2016.
(Continued)

*Primary Examiner* — Brandon S Cole
(74) *Attorney, Agent, or Firm* — Alliance IP, LLC

(57) ABSTRACT

Disclosed is a battery interconnected detection and alert device system with building structure vibrational alert. The system includes of one or more alert devices wired into a dedicated circuit with a single location housing a DC power backup source, such as a rechargeable DC battery. The DC power backup source may be replaceable or rechargeable with DC current from an AC-DC transformer-rectifier, a photovoltaic cell, or other means. An electrical relay within the system provides a current to the dedicated circuit by selecting between the line-voltage alternating current source and the DC power backup. When activated, the detection and alert device generates a distinctive pulsed vibrational alert transmitted through the building structure to beds and other furniture resting on the floor, and additionally transmitted through the air as pressure waves which are perceived by hearing-impaired and other persons alerting them to a possible emergency situation.

26 Claims, 8 Drawing Sheets

Related U.S. Application Data is a continuation-in-part of application No. 13/407,443, filed on Feb. 28, 2012, now abandoned.

(60) Provisional application No. 61/464,115, filed on Feb. 28, 2011.

(51) Int. Cl.

| | | |
|---|---|---|
| *G08B 1/08* | (2006.01) | |
| *H02J 3/00* | (2006.01) | |
| *A61H 1/00* | (2006.01) | |
| *G08B 6/00* | (2006.01) | |
| *G08B 17/10* | (2006.01) | |
| *G08B 21/14* | (2006.01) | |
| *H02J 3/02* | (2006.01) | |
| *H02J 9/06* | (2006.01) | |
| *G08B 29/18* | (2006.01) | |
| *G08B 13/00* | (2006.01) | |
| *H02J 7/00* | (2006.01) | |
| *H02J 7/35* | (2006.01) | |

(52) U.S. Cl.
CPC .............. *H02J 9/061* (2013.01); *G08B 13/00* (2013.01); *G08B 17/10* (2013.01); *H02J 7/007* (2013.01); *H02J 7/0055* (2013.01); *H02J 7/35* (2013.01); *H02J 9/065* (2013.01); *Y02B 10/14* (2013.01); *Y02B 10/72* (2013.01); *Y02E 10/566* (2013.01); *Y10T 29/49117* (2015.01)

(58) Field of Classification Search
CPC .......... H02J 9/061; H02J 7/0055; H02J 7/007; H02J 7/35; H02J 9/065; Y10T 29/49117; Y02B 10/14; Y02B 10/72; Y02E 10/566
USPC ...................................................... 307/43–87
See application file for complete search history.

(56) References Cited

U.S. PATENT DOCUMENTS

| | | | |
|---|---|---|---|
| 5,365,145 A | 11/1994 | Fields | |
| 5,640,058 A | 6/1997 | Calvo | |
| 5,686,884 A * | 11/1997 | Larkin | G08B 1/08 340/4.12 |
| 5,929,781 A | 7/1999 | Vosika | |
| 5,973,603 A | 10/1999 | Judy | |
| 7,576,659 B2 | 8/2009 | Lax | |
| 9,909,736 B2 | 3/2018 | Kim et al. | |
| 2005/0106536 A1* | 5/2005 | Liebermann | G09B 21/009 434/112 |
| 2005/0159685 A1* | 7/2005 | Klein | A61H 23/02 601/49 |
| 2005/0178539 A1 | 8/2005 | Rota et al. | |
| 2005/0195089 A1 | 9/2005 | Shomali | |
| 2006/0017560 A1* | 1/2006 | Albert | G08B 1/08 340/531 |
| 2006/0017579 A1* | 1/2006 | Albert | G04G 13/021 340/628 |
| 2006/0129308 A1* | 6/2006 | Kates | A61H 3/061 701/532 |
| 2006/0170542 A1 | 8/2006 | Schoor | |
| 2006/0195050 A1* | 8/2006 | Alwan | A61B 5/1038 600/595 |
| 2006/0226973 A1* | 10/2006 | Catlin | G08B 17/10 340/539.11 |
| 2006/0265195 A1 | 11/2006 | Woodard et al. | |
| 2008/0074885 A1 | 3/2008 | Brands et al. | |
| 2008/0266121 A1 | 10/2008 | Ellul | |
| 2008/0272906 A1* | 11/2008 | Breed | B60C 11/24 340/539.11 |
| 2008/0315774 A1 | 12/2008 | May et al. | |
| 2010/0139290 A1* | 6/2010 | Leblond | F25B 21/02 62/3.3 |
| 2010/0237695 A1 | 9/2010 | Covaro et al. | |
| 2010/0308982 A1* | 12/2010 | Cooperstock | G06F 3/011 340/407.1 |
| 2011/0210694 A1 | 9/2011 | Uehashi et al. | |
| 2012/0217799 A1* | 8/2012 | Palmer | H02J 3/02 307/22 |
| 2013/0025851 A1* | 1/2013 | Laing | E21B 44/00 166/250.01 |
| 2014/0203943 A1 | 7/2014 | Kates | |
| 2015/0084780 A1 | 3/2015 | Palmer et al. | |
| 2015/0187194 A1 | 7/2015 | Hypolite et al. | |
| 2015/0216017 A1 | 7/2015 | Pratt et al. | |

OTHER PUBLICATIONS

PCT International Search Report and Written Opinion in PCT International Application U.S. Appl. No. PC/TUS2017/024139 dated Aug. 11, 2017.

* cited by examiner

BATTERY INTERCONNECTED ALERT DEVICE SYSTEM WITH VIBRATIONAL ALERT

CROSS REFERENCE TO RELATED APPLICATION

This application is a continuation-in-part of U.S. Patent Application to Preston Palmer et al. entitled "CENTRAL BATTERY INTERCONNCECTED SMOKE DETECTOR SYSTEM WITH SINGLE WIRE AC AND DC PASS-THROUGH RELAY," Ser. No. 14/557,362, filed Dec. 1, 2014, which is in turn a continuation-in-part of U.S. Patent Application to Preston Palmer et al. entitled "CENTRAL BATTERY INTERCONNCECTED SMOKE DETECTOR SYSTEM WITH SINGLE WIRE AC AND DC PASS-THROUGH RELAY," Ser. No. 13/407,443, filed Feb. 28, 2012, which claims priority to the U.S. Provisional Patent Application to Preston Palmer et al. entitled "CENTRAL BATTERY INTERCONNCECTED SMOKE DETECTOR SYSTEM WITH SINGLE WIRE AC AND DC PASS-THROUGH RELAY," Ser. No. 61/464,115, filed Feb. 28, 2011 the disclosures of which are hereby incorporated entirely herein by reference.

BACKGROUND OF THE INVENTION

Technical Field

This invention relates to alert device systems. In particular, embodiments of the invention relate to a system comprising devices and a method of use for alerting hearing-impaired and other persons using pulsed vibration of a building structure transmitted from an installed alert device.

State of the Art

Conventional smoke detectors are representative of alert devices. To be effective in minimizing injuries and death for deaf and severely hearing impaired persons, however, a system of alert devices, such as smoke detectors, must 1) be functional; and 2) provide a non-auditory alert.

A reliably functioning system of smoke detectors in a home or commercial building saves lives. In the U.S., many states require smoke alarms/detectors in both residential and commercial buildings, particularly in new construction. Current smoke detector alarm systems vary in the manner through which the individual detectors are interconnected and powered. Most commonly, smoke detectors are wired into an isolated alternating current ("AC") power circuit ("dedicated circuit") in a residential or commercial building to provide a reliable, continuous source of power. In the event of a power failure wherein the dedicated circuit is no longer energized with an external current from a remote AC power source, a conventional DC battery within each detector provides backup power to the device. This generally works fine, unless these backup-power batteries fail or are disconnected. According to the National Fire Protection Association ("NFPA"), almost two-thirds of home fire deaths from 200-2009 resulted from fires in homes without smoke detector alarms or in homes where smoke detector alarms were non-functioning. The NFPA reports that eighty percent of smoke alarm failures during this period arose from a missing or disconnected battery, dead or discharged battery, or line AC power failure/shut-off/disconnect. When the voltage of a backup direct current ("DC") battery in an individual smoke detector weakens, a typical detector emits an audible alarm consisting of regular, loud beeps or chirps, alerting the building's occupant to replace the old, discharged battery with a fresh one.

Audible alarms, however, are ineffective in providing an alert to a deaf or severely hearing-impaired person. Currently, the NFPA notes that smoke alarms utilizing an alternative alert means are available for use by deaf and severely impaired persons. Those means include strobe lights and vibration notification appliances, such as pillow or bed shakers that are physically separate from the smoke detector and are activated by the sound of the alarm emanating from the smoke detector.

Problems exist with these currently available systems. For example, a visual alert, such as strobe lights, requires the person's face to be turned toward the light and uncovered. Many people sleep on their sides, face-down, or with their face shielded by the bedcovers or pillows. Even so, a person facing in the general direction of a strobe or similar visual alert who is deeply asleep may not be awakened by the light of the visual alert. Some severely hearing-impaired persons are also sight-impaired, and cannot see or respond to a visual alert. Vibration or "shaking" alert systems are better. Existing systems, however, require separate devices connected to the bed, pillow, etc. A vibration alert system requiring separate devices fails with the failure of the separate device, such as when battery power is not available to the device, the device is not turned on, the device is plugged in but AC power is interrupted, the hearing-impaired person is asleep in a chair, sofa, or other location than a bed or other piece of furniture directly attached to the vibration alert device. Additionally, currently available vibration-based alert devices for the hearing impaired merely alert the hearing-impaired person that an emergency exists and do not provide any information as to the nature of the emergency or instructions to the hearing-impaired person. For example, when a sleeping hearing-impaired person is awakened by a vibrational alert, that person may quickly dress and exit the building, thinking the building is on fire. In fact, other emergencies occur wherein to be safe, the person should remain in the building—like a tornado warning, street rioting, or the like.

Accordingly, what is needed is a alert device that simultaneously: 1) provides a backup power source to an existing interconnected system of detection and alert devices in a residence or commercial building; 2) monitors the functionality of each individual emergency detection and alert device; 3) generates an alert that will awaken any person, including a sight or hearing-impaired person; and 4) communicates the situational nature of the alert to the person.

DISCLOSURE OF EMBODIMENTS OF THE INVENTION

This invention relates to alert device systems. In particular, embodiments of the invention relate to a system comprising devices and a method of creating the same for alerting severely hearing-impaired and other persons to a variety of potentially dangerous situations by using pulsed vibration of a building structure transmitted from an installed alert device. The system additionally provides direct current ("DC") backup power through a dedicated circuit to an interconnected system of detection and alert devices installed in a residential or commercial building.

Disclosed is an alert device system comprising a vibration source coupled to a building structure; and a power source coupled to the vibration source; wherein activation of the vibration source causes a vibration of the building structure.

In some embodiments, the vibration source is an offset motor. In some embodiments, the vibration is a pulsed vibration. In some embodiments, the vibration is at a frequency between about 100 Hertz and about 200 Hertz. In some embodiments, the vibration is at a frequency of about 120 Hertz.

In some embodiments, the alert device system further comprises an auditory alert device. In some embodiments, the alert device system further comprises a visual alert device. In some embodiments, the alert device system further comprises an emergency lighting system. In some embodiments, the alert device system further comprises a detection and alert device.

In some embodiments, the detection and alert device comprises a smoke detector. In some embodiments, the detection and alert device comprises a carbon monoxide detector. In some embodiments, the detection and alert device comprises an intruder detector. In some embodiments, the detection and alert device comprises a natural gas detector. In some embodiments, the detection and alert device comprises a radon gas detector. In some embodiments, the detection and alert device comprises a communication link to a government alert broadcast system.

Disclosed is a detection and alert device system comprising a dedicated circuit; an alert device coupled to the dedicated circuit, comprising a vibration source coupled to a building structure; wherein activation of the alert device causes a vibration of the building structure; an alternating current source; a first DC source located remote from the detection and alert device in a location of the building structure; a first relay electrically coupled to the dedicated circuit, the alternating current source, and the DC source, wherein the first relay conducts a current to the dedicated circuit by selecting between the alternating current source and the DC source.

In some embodiments, the first DC source is a rechargeable battery and the detection and alert device system further comprises a low voltage controller electrically coupled between the rechargeable battery source and the first relay; and a second DC source, wherein the low voltage controller selects a source for a charging current from a plurality of second DC sources and causes distribution of the charging current to the rechargeable battery.

In some embodiments, activation of the alert device causes a person in proximity to the building structure to sense pressure waves transmitted through air in proximity to the building structure.

In some embodiments, the detection and alert device system further comprises an alternating current to direct current transformer electrically coupled to the alternating current source and the low voltage controller, wherein the second DC source comprises the transformer. In some embodiments, the detection and alert device system further comprises a plurality of detection and alert devices electrically coupled to the dedicated circuit, wherein the low voltage controller responds to one activated detection and alert device by activating the plurality of detection and alert devices. In some embodiments, the detection and alert device system further comprises a manually activated alarm switch electrically coupled to the dedicated circuit, wherein the low voltage controller responds to the manually activated alarm switch by activating the plurality of detection and alert devices.

Disclosed is a detection and alert device comprising a case enclosing an alternating current circuit, a direct current circuit, a vibration source, and a third relay, wherein the vibration source coupled to a building structure through the case and wherein activation of the vibration source causes vibration of the building structure; and an external current, wherein the third relay determines whether the external current is an alternating current or a direct current, and under a condition wherein the external current is an alternating current, routes the external current to the alternating current circuit, and under a condition wherein the external current is a direct current, routes the external current to the direct current circuit.

Disclosed is a method of creating a detection and alert device system comprising the steps of forming a detection and alert device comprising a vibration source; and providing the detection and alert device for installation in a building structure.

In some embodiments, the vibration source causes a pulsed vibration. In some embodiments, the pulsed vibration source generates a pattern of pulsed vibrations which communicates a condition to a person perceiving the pattern of pulsed vibrations caused by the vibration source.

The foregoing and other features and advantages of the invention will be apparent to those of ordinary skill in the art from the following more particular description of the invention and the accompanying drawings.

DETAILED DESCRIPTION OF EMBODIMENTS OF THE INVENTION

Figure 1:
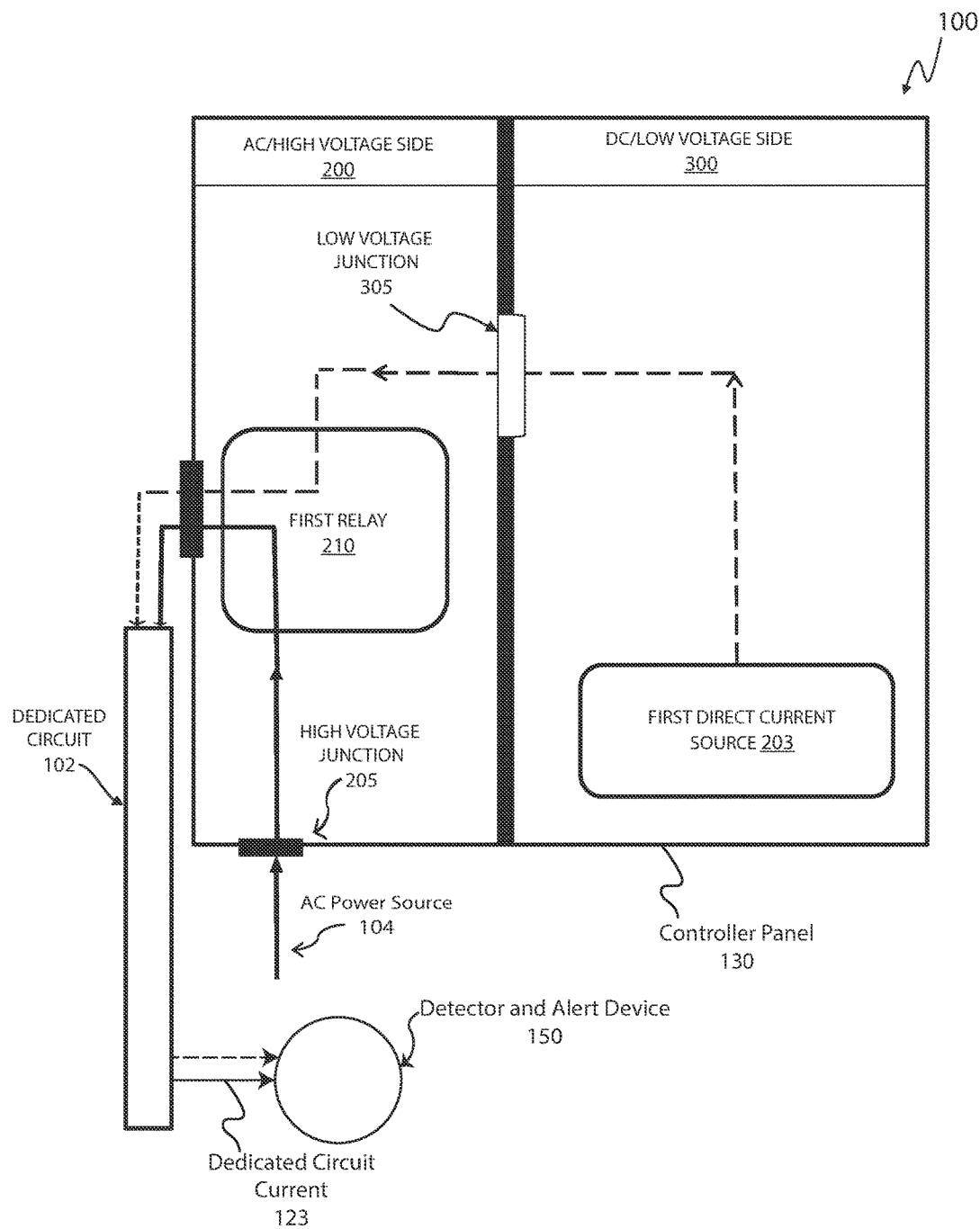
FIG. 1 is a schematic view of a battery interconnected alert device system 100.

As discussed above, the disclosed invention relates to an alert system with a remotely located DC battery power backup to alert hearing-impaired and other persons to the presence of a variety of potentially dangerous situations. In the event of an AC power failure, the system transmits power from a reliable, continuous DC backup source to one or a plurality of alert devices electrically coupled to a dedicated circuit, eliminating the need for a DC battery within each individual detection and alert device.

Existing detection and alert device systems use community-distributed AC power. There are, however, many reasons this line AC power commonly fails which necessitate the need for a backup power source for the detection and alert device. Examples of AC power failure include unintentional physical damage to power lines or other components of the community power distribution system, such as from a severe weather event or generation failure. Service may also be intentionally disconnected for non-payment, or following a bank foreclosure, or abandonment of the property. Accordingly, commercially available alert devices employ a nine-volt or other small DC battery housed within each individual alert device unit as a back-up source of power in the event AC power fails.

This ubiquitous system utilizing a different battery in each individual alert device is inadequate. When an individual device's battery is charged and functioning, the backup system works well. Problems arise, however, when a battery ages, loses its charge, and eventually fails. When the battery voltage drops below a given level, a conventional alert device will emit a periodic audible alarm, such as a loud "chirp." If the building housing the detector is occupied, this alarm is usually effective at getting the occupants' attention. When the occupant or owner is severely hearing impaired, an audible alarm is not heard. Either way, a responsible occupant or building owner will respond by simply replacing the old, discharged battery with a new, fresh battery.

All too often, however, this does not happen for two general reasons. The first reason is because changing the battery in even one standard alert device is inconvenient. Devices are usually mounted on a ceiling and require at least a step-stool, if not a tall ladder, for access. Even a small residence will have three or four alert devices; a large house may have up to a dozen or more. Therefore, a typical building will house multiple alert devices in difficult-to-access locations, each with a different battery which will fail and require replacement in its own time, different from all the other batteries. Some occupants change each battery as it fails. Others change all the individual device batteries when one device battery fails, resulting in discarding some batteries prematurely creating an unnecessary waste and expense. To avoid future inconvenience, however, many occupants respond to an alert device's battery-failure alarm by disabling or removing all of the similar individual alert devices throughout the building.

The second reason is because the building is unoccupied for an extended period of time. Many homes and buildings stand vacant for months or years awaiting sale, or while awaiting renovation or restoration. Buildings unoccupied for a lengthy period often have no AC electrical service. A great many of these buildings are not regularly visited or attended. If functioning alert devices are present in these buildings, the batteries all fail after an extended period and the building is left without a functioning detection and alert device system.

An additional less-common but critically important issue is that audible alarms are ineffective in providing an alert to a deaf or severely hearing-impaired person. Moreover, the problems with existing alert devices for the hearing impaired using a vibrational or visual alert, including failure to effectively transmit the vibration or visual alert to the person, have been discussed herein above.

Embodiments of the disclosed invention solve these and other problems by creating a pulsed vibratory alert which is transmitted through the building structure to furniture pieces resting on the floor. The pulsed vibration is transmitted to furniture regardless of the floor's composition, whether wood-frame, concrete, or other. The vibrating furniture piece alerts any person resting thereon to the presence of a possibly dangerous situation, such as a building fire, severe weather, gas leak, and others. Additionally, a pattern of pulsed vibrations may communicate the specific nature of the situation or emergency along with instructions, according to the pattern of pulsed vibrations. Embodiments of the disclosed invention also eliminate the need to monitor and regularly change batteries housed in detection and alert devices located in hard-to-reach locations. The disclosed invention provides a continuous reliable source of backup DC power for detection and alert devices wired into a dedicated circuit.

Disclosed is a battery interconnected detection and alert system with building structure vibrational alert. What immediately follows is a general overview of the system. Afterward, additional details are provided in a detailed description of each of the various drawing figures.

In some embodiments, as shown in FIG. 1, the system generally comprises an AC power source 104, a first DC source 203, a first relay 210, a dedicated circuit 102, and a detection and alert device 150. Detection and alert device 150 is powered by an external current conducted by dedicated circuit 102. Dedicated circuit 102, in some embodiments, is a wiring circuit present within a building structure, whether a commercial or a residential building or other structure, which is electrically isolated from other electrical currents in the building structure. Many building structures already comprise a dedicated circuit coupled to a plurality of smoke detectors, as one example of a detection and alert device. Currently, however, a dedicated circuit in an existing building is only coupled to and conducts current from an AC source. Such dedicated circuits are not coupled to and, therefore, do not conduct current from a DC source. Detection and alert device 102, being electrically coupled to dedicated circuit 102 which may conduct either an AC external current or a DC external current to device 102 must, therefore, determine whether the external current is AC or DC.

First relay 210 is electrically coupled to an AC power source 104, a first DC source 203, and dedicated circuit 102 coupled to one or a plurality of detection and alert devices 150. AC power source 104, in some embodiments, derives from a conventional power generation and distribution system. For purposes of this disclosure, the term "line voltage" is used synonymously with AC power source 104. First DC source 203, in some embodiments, is a rechargeable battery 310 (shown in FIG. 2, FIG. 3, and FIG. 4.) In various embodiments, first relay 210 selectively delivers AC electricity from AC power source 104 to detection and alert device(s) 150 through dedicated circuit 102 so long as AC power source 104 is present. When AC power source 104 is absent, such as during a power failure or disconnected service, first relay 210 selectively delivers first DC source 203 to detection and alert devices 150 through dedicated circuit 102. First relay 210, by default, energizes dedicated circuit 102 with AC power, switching to DC battery power when AC power fails or is otherwise absent. When AC power source 104 is absent, first relay 210 delivers DC power from first DC source 203 to detection and alert devices 150 through the same physical wiring—dedicated circuit 102—as is energized with AC from alternating current power source 104 when line voltage is present. In this manner, some embodiments of the invention allow for a single-battery source of back-up DC power to one or a plurality of detection and alert devices 150, eliminating the need to house a battery within each individual detection and alert device 150.

A central battery AC/DC controller panel 130, in some embodiments, is located in a convenient location in or immediately outside the building. It is convenient to install controller panel 130 adjacent or near the building's traditional service-entrance electrical panel. Controller panel 130, in some embodiments, houses first DC source 203 and first relay 210. Controller panel 130, in some embodiments, receives AC power source 104 via the building's service entrance panel, typically a circuit breaker box. Controller panel 130, in some embodiments, outputs AC power or direct current, as determined by first relay 210, back to the service entrance panel to energize dedicated circuit 102. Because a first DC source 203, such as a rechargeable DC battery in some embodiments, is housed in a convenient location such as near the service entrance panel within controller panel 130, access to first DC source 203 for service or replacement is safe and uncomplicated. In some embodiments, controller panel 130 is mounted at standing-eye-level, so that a stool, ladder, or the like is not required to access first DC source 203. Therefore, in some embodiments wherein first DC source 203 comprises a rechargeable DC battery, the need for multiple periodic battery changes is eliminated. Some embodiments additionally comprise one or more additional DC sources, such as a photovoltaic cell and/or AC power source 104 current modified by an AC/DC transformer, for example.

FIG. 1 shows an example embodiment of a battery interconnected alert device system with vibrational alert 100. System 100 comprises controller panel 130 with an AC/high voltage side 200 and a D/C low voltage side 300, dedicated circuit 102, and detection and alert device 150. In FIG. 1, and other drawing figures, solid lines connecting components represent electrical connections conducting AC power and dashed lines connecting components represent electrical connections conducting DC power. Arrows on the ends and/or mid-segments of solid and dashed electrical connection lines represent the direction of current flow. AC/high voltage side 200 comprises first relay 210. In the embodiment shown in FIG. 1, alternating current from AC power source 104 enters an AC/high voltage side 200 of system 100 and is electrically coupled to first relay 210. As mentioned above, first relay 210 is also electrically coupled to first DC source 203 and dedicated circuit 102. First DC source 203, in some embodiments, is housed inside DC/low voltage side 300 of system 100 and is discussed in detail below.

In some embodiments, AC/high voltage wiring is physically separated from DC/low voltage wiring within controller panel 130 for safety reasons. In the United States, line AC voltage is 220 volts, stepped-down to 110 volts at the service entrance panel. Contact with high voltage AC power from a typical 110 volt AC power source 104 may, under certain conditions, result in electrocution. Further, the need to access any of system 100's components located in AC/high voltage side 200 should be very infrequent. Conversely, contact with relatively low voltage, such as DC power from a typical 12 volt first DC source 203, in some embodiments, should almost never result in serious injury. Additionally, in some embodiments, first DC source 203 will periodically need replacement, such as when a non-rechargeable DC battery or a rechargeable DC battery comprises first DC source 203. Therefore, controller panel 130, in some embodiments, is constructed so as to physically isolate the relatively safe currents present in DC/low voltage side 300 from the more hazardous currents present in AC/high voltage side 200.

In the embodiments of system 100 shown in FIG. 1, and some other embodiments, wiring carrying DC current from first DC source 203 passes from DC/low voltage side 300 to AC/high voltage side 200 through a low voltage junction 305. Low voltage junction 305, in some embodiments, is any one of a variety of pass-through conduits commercially available and known to those in the art electrically insulated from contact by a physical partition between AC/high voltage side 200 and DC/low voltage side 300 of controller panel 130. Similarly, AC power from AC power source 104 enters AC/high voltage side 200 through a high voltage junction 205. High voltage junction 205, in some embodiments, is any one of a variety of pass-through conduits commercially available and know to those in the art electrically insulated form contact with the physical outer wall of controller panel 130.

First relay 210 of system 100, in the embodiment shown in FIG. 1 and some other embodiments, selectively delivers alternating current from AC power source 104 to dedicated circuit 102 so long as AC power is available. In some embodiments, first relay 210 is rated for a 110 V AC input and a 12 V DC input. In some embodiment, first relay 210 is a mechanical relay. In some embodiments, first relay 210 is a solid-state relay. In some embodiments, first relay 210 is selected from a variety of commercially available devices known in the art. Factors affecting the choice of component for first relay 210 include the AC voltage and amperage of the line current entering first relay 210 from AC power source 104. In a default condition where line voltage is present from AC power source 104, first relay 210 conducts AC power to dedicated circuit 102.

Dedicated circuit 102 is an electrical circuit electrically coupled to alert device 150 or an interconnected plurality of alert devices 150. A dedicated circuit interconnecting smoke detectors, as a non-limiting example of an alert device, has widely been adopted in residential building codes throughout the U.S. since written into the National Fire Alarm Code in 1989. Therefore, dedicated circuit 102 is generally present in all newer residential buildings and widely known to those with skill in the art.

Alert device 150 with vibrational alert is compatible with a conventional dedicated circuit, such as dedicated circuit 102 shown in FIG. 1, in some embodiments. An existing dedicated circuit installed in a building structure conducts either AC or DC, such as from AC power source 104, first DC source 203, or a second direct current 302 (See FIG. 2) to alert device 150. DC from either first DC source 203 or second DC 302 is sufficient to power a vibration source 153 (See FIG. 6). Electrically coupling alert devices 150 to dedicated circuit 102 interconnects the devices and enables simultaneous activation of all alert devices 150 electrically coupled to dedicated circuit 102 when a single detection and alert device 150 is activated, in some embodiments. In some embodiments, an alarm switch 406 is electrically coupled to dedicated circuit 402 (See FIG. 3).

When AC power source 104 is absent, first relay 210 delivers DC power from first DC source 203 to alert devices 150 through the same physical wiring—dedicated circuit 102—as is energized with AC from AC power source 104 when line voltage is present. Although dedicated circuit 102 is energized with AC power when AC power is available, dedicated circuit 102 is able to conduct sufficient DC to energize a plurality of detection and alert devices 150 along the limited lengths of wire present in a residential or small commercial building without a substantial voltage drop across the internal electrical resistance in the wires of dedicated circuit 102. Further, because dedicated circuit 102 is only coupled to alert devices 150 and, in some embodiments, alarm switch 406 but no other electrical loads, electrical resistance is minimized and available voltage is conserved. Therefore, when line AC is not available, first relay 210 completes a circuit to first DC source 203, wherein dedicated circuit 102 is powered by first DC source 203. First DC source 203 provides adequate DC power to energize a plurality of alert devices 150 electrically coupled to dedicated circuit 102 without a drop in voltage below the operational threshold voltage of alert devices 150.

FIG. 1 also shows dedicated circuit 102 carrying a dedicated circuit current 123 to alert device 150. As discussed, when an AC power source 104 is present, dedicated circuit current 123 is AC. When AC power source 104 is absent, dedicated circuit current 123 is DC. FIG. 1 shows dedicated circuit current 123 as two electrical connections, one DC and one AC. This is merely a schematic representation; the same physical wiring conducts either AC power or DC power, depending upon whether AC power source 104 is present. First relay 210 selectively chooses whether to energize dedicated circuit 102 with DC power depending upon the availability of AC power from AC power source 104 as discussed.

Figure 2:
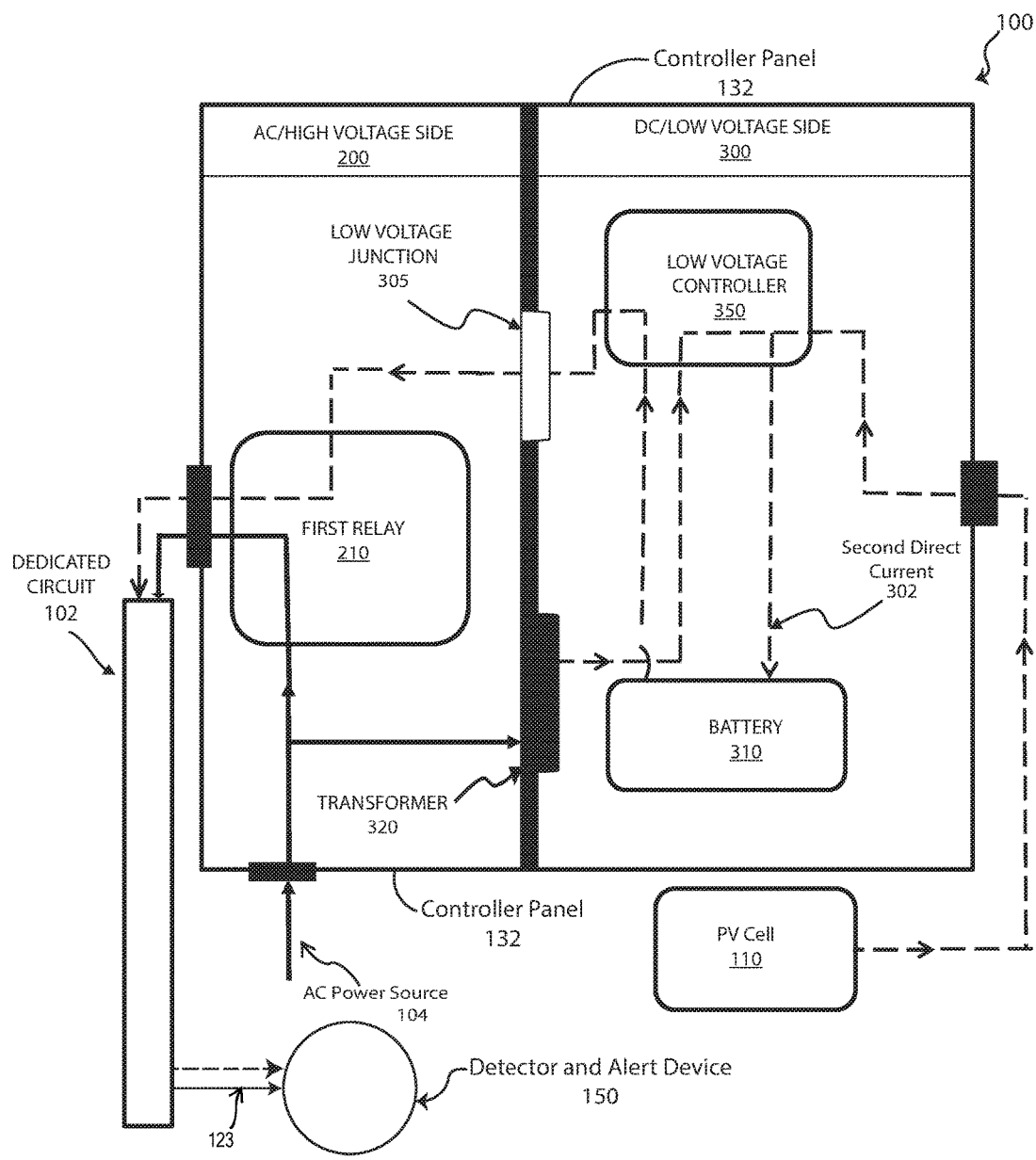
FIG. 2 is a schematic view of a battery interconnected alert device system 100.

FIG. 2 shows an example embodiment of battery interconnected alert device system with building structure vibrational alert 100. In the embodiment shown in FIG. 2, and in some other embodiments, a battery 310 is first DC source 203. Battery 310, in some embodiments, is a non-rechargeable DC battery, such as a 12 volt dry cell "lantern" battery. In some embodiments, battery 310 is two 6 volt dry cell batteries electrically connected in series to deliver 12 volts. In still other embodiments, battery 310 is some other non-rechargeable battery or a combination of batteries such that the total available voltage and current provided by battery/batteries 310 result in a first DC source of sufficient voltage and available current to power the building's system of alert devices 150 interconnected on dedicated circuit 102. Some advantages of using a non-rechargeable battery 310 as first DC source 203 are low cost and a more simple design. One disadvantage is the limited useful life of a non-rechargeable battery before it needs to be replaced. Another disadvantage is failure of a non-rechargeable battery 310 as available backup DC power (i.e., first DC source 203) to battery interconnected alert device system with vibrational alert 100 in a building which has been abandoned or otherwise unattended for a long period of time.

In some embodiments, battery 310 is a rechargeable battery. The use of a rechargeable battery 310 versus a non-rechargeable battery 310 is advantageous in some embodiments of system 100 which provide an automatic recharging means, such as the non-limiting example embodiment of system 100 shown in FIG. 2 and discussed further herein below. A rechargeable battery has a longer useful life than a non-rechargeable battery. In some embodiments of system 100 wherein battery 310 comprises a rechargeable battery, additional components comprising an automatic recharging means provide for a first DC source 203, such as a rechargeable battery 310 for example, to provide potentially years of continuous DC power to alert devices 150 in a completely unattended building wherein AC power source 104 is continuously unavailable, or unavailable for extended periods. In some embodiments, rechargeable battery 310 is a UB 1250 12 volt sealed lead-cell battery. This is by way of example only. In some embodiments, battery 310 is a rechargeable lead cell, nickel-cadmium, lithium hydride, or any other suitable battery, whether rechargeable or not. Many other suitable examples are commercially available and known to those skilled in the art.

FIG. 2 additionally shows a means for recharging battery 310 of system 100 with a second DC current 302. In the embodiment of system 100 shown in FIG. 2 and in some other embodiments, DC/low voltage side 300 further comprises a low voltage controller 350, a transformer 320, and a photovoltaic ("PV") cell 110. In this embodiments, low voltage controller 350 selects second DC source 302 from a plurality of sources, such as PV cell 110 or AC power source 104 modified by transformer 320, for example. In the example embodiment shown in FIG. 2, low voltage controller 350 is electrically coupled to PV cell 110, transformer 320, battery 310, and first relay 210. In some embodiments, low voltage controller 350 selects and routes DC power from second DC source 302 to recharge battery 310. In some embodiments, low voltage controller also routes DC from first DC source 203, such as battery 310 in the embodiment shown, to first relay 210.

In some embodiments, low voltage controller 350 selects a DC charging current output from a plurality of available second direct current 302 inputs. In the example embodiment shown by FIG. 2, low voltage controller 350 conducts DC from transformer 320 to charge battery 310 under conditions where AC power source 104 is present. Under conditions where AC power source 104 is not present, such as a power outage or disconnection of service, low voltage controller 350 conducts DC from PV cell 110, provided that DC is available from PV cell 110. In some embodiments, low voltage controller comprises a battery charging means to regulate DC delivered to battery 310 by monitoring the charge state of battery 310. Such a charging means functions to maximize the charge status and extend the useful life of battery 310. Consequently, battery 310 remains fully charged by low voltage controller 350 under conditions where either AC power source 104, sunlight, or both are available in some embodiments, including the embodiment shown in FIG. 2.

Transformer 320, in some embodiments, is an AC/DC step-down transformer operating between 110 volt AC and 12 volt DC voltages. Transformer 320 converts 110 volt AC line input power to 12 volt DC power for recharging battery 310, in some embodiments. Transformer 320 may be selected from a variety of commercially available AC/DC step-down voltage transformers to operate between different ranges of AC and DC voltages and amperages depending upon the characteristics of AC power source 104 and the parameters under which low voltage controller 350 recharges battery 310. These parameters, in turn, depend upon the charging requirements of battery 310.

In some embodiments, PV cell 110 is a photovoltaic cell electrically coupled to low voltage controller 350. PV cell 110 provides threshold DC amperage at 12 volts to generate a charging current 302 for battery 110 under conditions where PV cell 110 is exposed to adequate incident sunlight. Many suitable examples of photovoltaic cells for use as PV cell 110 are commercially available and may be used in various embodiments of the invention. In some embodiments, PV cell 110 is a relatively small photovoltaic cell, 12 inches to 18 inches by 24 inches, for example, which is secured in a sunlit indoor location, such as an un-shaded southern-facing window, to deter theft or vandalism, in some embodiments. In some embodiments, PV cell 110 is secured in an outdoor location. In some embodiments, PV cell 110 is mounted on the outside of a controller panel 132. In some embodiments, PV cell 100 is secured to the building's outer wall, a rooftop, a stand-alone mounting pole, a fence, an out-building or any other suitable outdoor location exposed to sunlight.

In some embodiments (not shown in the drawing figures), first DC source 203 comprises PV cell 110. In these and some other embodiments, low voltage controller 350 conducts DC power from PV cell 110 directly through low voltage junction 305 to first relay 210 when DC power at a threshold voltage is generated by PV cell 110.

Figure 3:
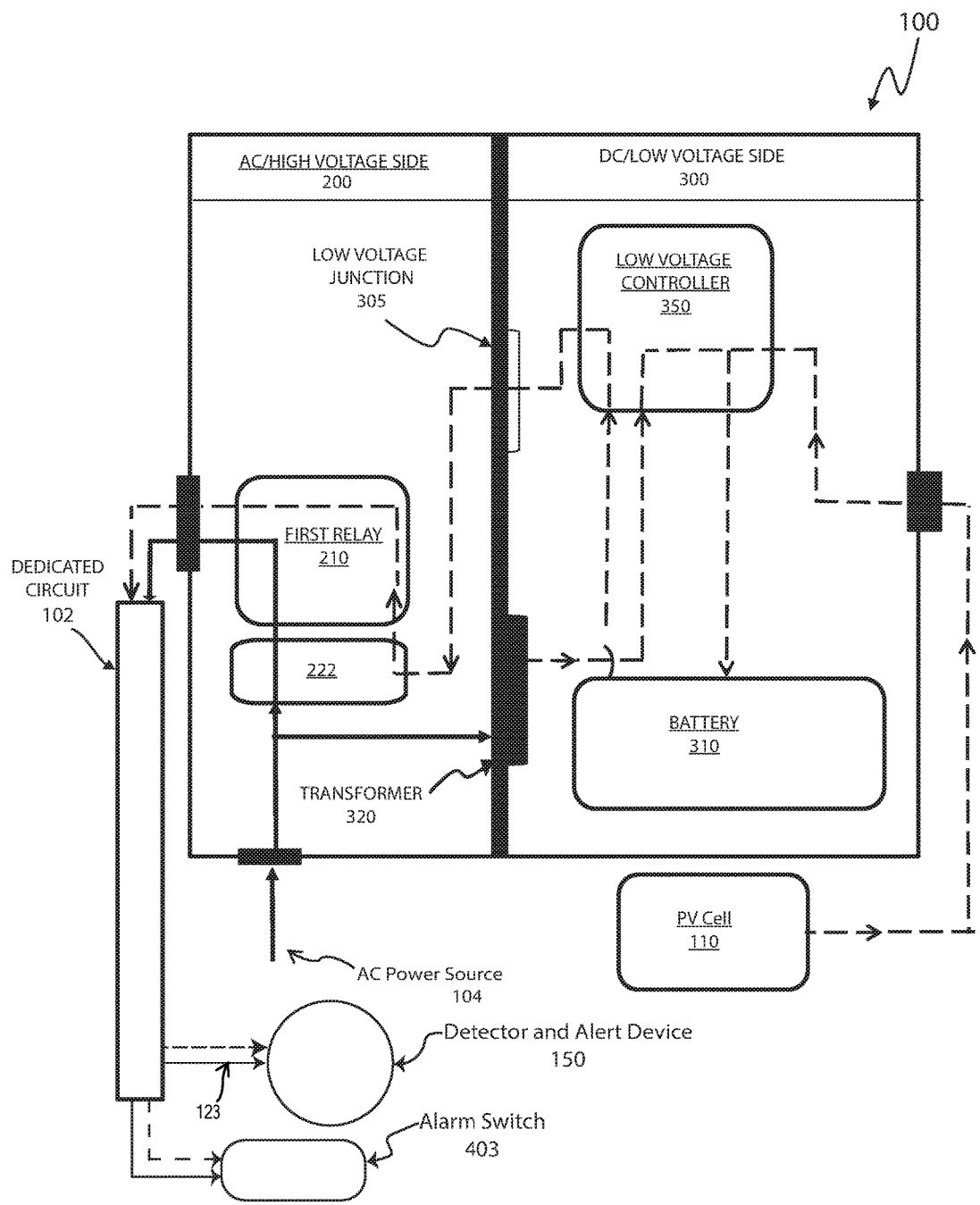
FIG. 3 is a schematic view of a battery interconnected alert device system 100.

FIG. 3 shows an example embodiment of battery interconnected detection and alert device system with vibrational alert 100. FIG. 3 shows all the elements of system 100 shown in FIG. 2 with the addition of a first timed relay 222 and an alarm switch 403.

Electrically interposing first timed relay 222, shown in FIG. 2, between AC power source 104 inputting to dedicated circuit 102 through first relay 210, in some embodiments, allows high voltage charge present within capacitors and other electronic components of detection and alert device 150, dedicated circuit 102, and first relay 210 at the instant preceding cessation of the external current from AC power source 104 to dissipate charge for a time interval prior to re-energizing these elements with low voltage DC power from first DC source 203. Additionally, first timed relay 222, in some embodiments, is a mechanism to increase safety by minimizing or eliminating any risk of electrical arcing or interference between AC and DC in the same circuit. The use of first timed relay 222, a second timed relay 312 (See FIG. 4), and third timed relay 422 (not shown in the drawing figures) in some embodiments, is by example only. Other electronic components, such as resistors or diodes, for example, may be used in system 100 to accomplish the same or similar function.

First timed relay 222 is electrically coupled to AC power source 104, low voltage controller 350, and first relay 210. In some embodiments, first timed relay 222 is a mechanical relay. In some embodiments, first timed relay 222 is a solid state relay. First time relay 222 is electrically interposed between AC and DC input currents and first relay 210 to provide a timed delay between termination of AC power and transmission of DC power from low voltage controller 350 to first relay 210. In some embodiments, this is a one second delay. In some embodiments, this delay is between 500 milliseconds and one second. In some embodiments, this delay is shorter than 500 milliseconds. In some embodiments, this delay is longer than one second. First timed relay 222 may be selected from mechanical or solid-state relays that are commercially available and known to those with skill in the art.

In some embodiments, alarm switch 403 is electrically coupled to dedicated circuit 102, wherein manual activation of alarm switch 403 causes activation of battery interconnected alert device system with vibrational alert 100, similar to activation by detection and alert device 150. Alarm switch 403 allows for manual activation of system 100 by an occupant of a building structure wherein system alert device 150 is installed, causing alert device 150 to transmit a vibrational alert a hearing impaired or other person present in the building structure.

Figure 4:
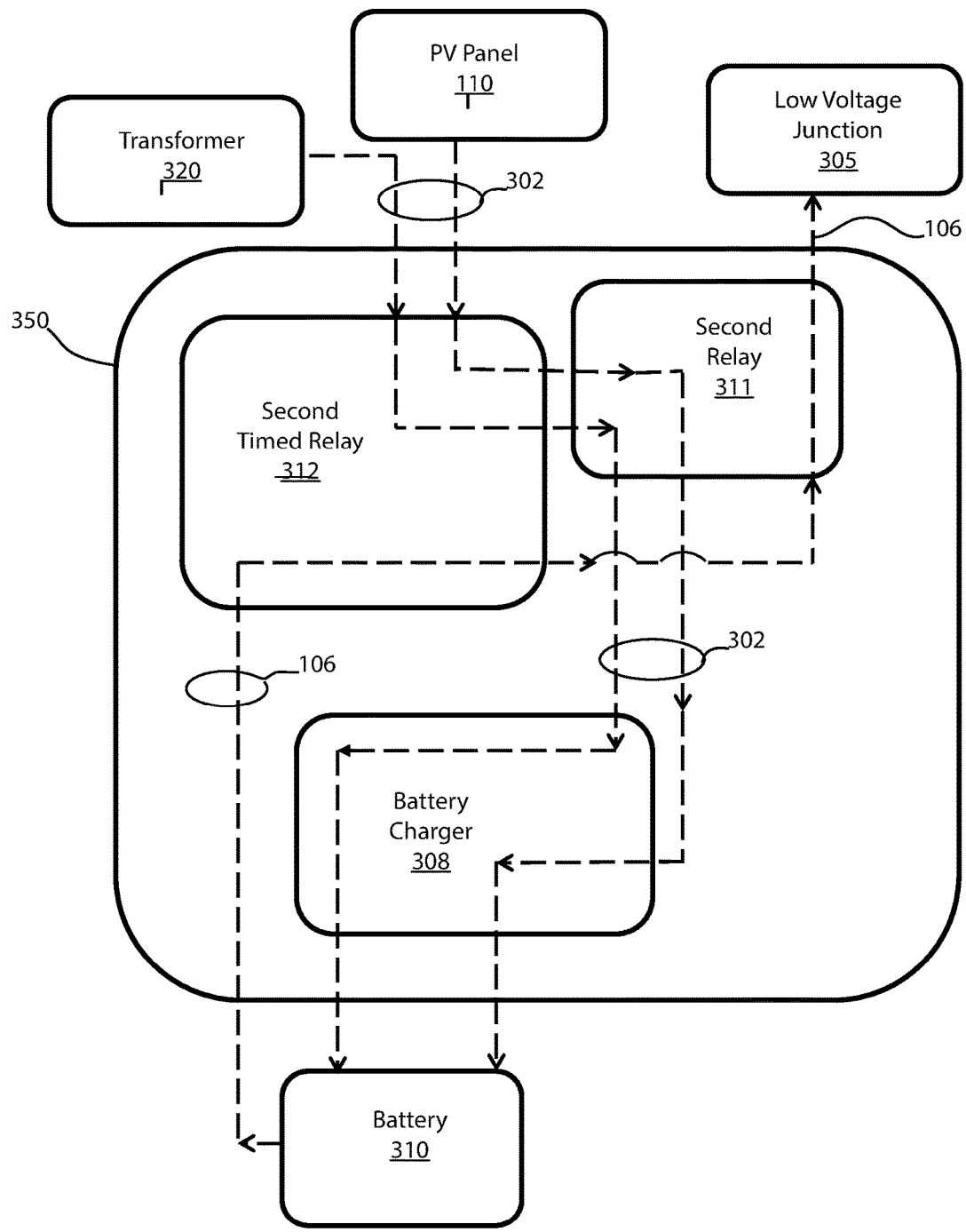
FIG. 4 is a schematic view of a low voltage controller 350 of a battery interconnected alert device system 100.

FIG. 4 shows a detailed schematic representation of an example embodiment of low voltage controller 350. Low voltage controller 350 has two functions. First, low voltage controller 350 functions to direct a charging second direct current 302 to battery 310 from a plurality of second direct currents 302. In some embodiments, second direct current 302 comprises AC power source 104 modified by transformer 320, such as to rectify and AC current to a DC current, and to either increase or decrease the voltage of the DC current. In some embodiments, second DC source 302 comprises PV panel 110. In still other embodiments, second direct current 302 comprises a direct current not described herein. Any combination of one, two, three, or more than three second direct currents 302 are electrically coupled to low voltage controller 350 in various embodiments of the invention. Battery 310 supplies first direct current 106 to low voltage junction 305, via second relay, in some embodiments. In some embodiments, second timed relay 312 in electrically interposed in first direct current 106 between battery 310 and second relay 311.

Second, low voltage controller 350 functions to route DC power from battery 310 directly to first relay 210 or indirectly through first timed relay 222, depending on whether the embodiment comprises first timed relay 222.

In the example embodiment shown in FIG. 4, low voltage controller 350 comprises second relay 311, second timed relay 312, and a battery charger 308. Battery charger 308, in some embodiments, comprises a commercially available DC battery charger/inverter which uses DC current from PV panel 110, or AC current from transformer 320 (changed to DC current by the inverter) Low voltage controller 350 is electrically coupled to battery 310, transformer 320, and/or PV panel 110. This arrangement is not meant to be limiting. Any number and combination of electrical/electronic devices can be assembled to perform the two functions disclosed herein above. For example, low voltage controller 350 may simply comprise a unitary solid state device such as a commercially available DC-DC power management integrated circuit known to those skilled in the art.

In the embodiment shown in FIG. 4, battery 310 is electrically coupled to second timed relay 312 of low voltage controller 350. Second timed relay 312 functions in a manner analogous to first timed relay 222 discussed herein above. In some embodiments, second timed relay 312 is electrically interposed between battery 310 and second relay 311 and creates a timed delay between termination of DC power from transformer 320 and transmission of DC power from battery 310 to second relay 311. In some embodiments, this second timed relay 312 creates about a one second delay between arrival of DC from battery 310 and provision of DC to second relay 311. In some embodiments, the delay is between about 500 milliseconds and about one second. In some embodiments, the delay is shorter than about 500 milliseconds. In some embodiments, the delay is longer than about one second. Second timed relay 312 may be selected from mechanical or solid-state relays that are commercially available and known to those with skill in the art. In some embodiments (not shown), second timed relay 312 is not present and battery 310 is electrically coupled directly to second relay 311.

When no AC power source 104 is available, DC power from battery 310 is routed through low voltage junction 305 to AC/high voltage side 200 (See FIG. 1.)

Figure 5:
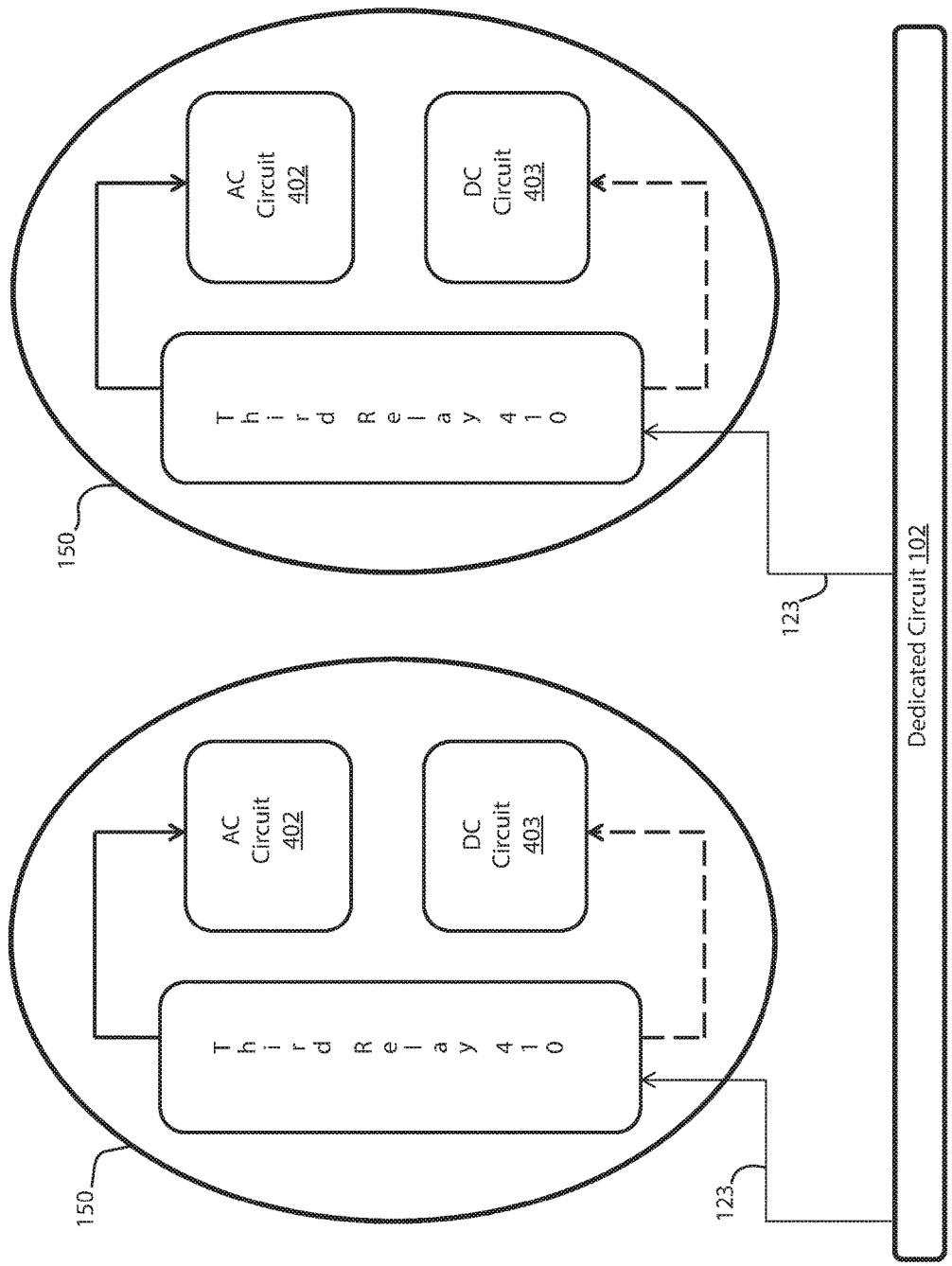
FIG. 5 is a schematic representation of two battery interconnected alert devices 150 electrically coupled to dedicated circuit 102.

FIG. 5 shows a schematic representation of two alert devices 150 electrically coupled to dedicated circuit 102. This illustration is by example only and not meant to be limiting. One, three, or any number of alert devices 150 are electrically coupled to dedicated circuit 102 in some of the various embodiments of the invention.

In some embodiments, detection and alert device 150 comprises an AC circuit 402 electrically coupled to third relay 410. In such embodiments, an example of which is shown in FIG. 5, third relay 410 is coupled to dedicated circuit current 123 comprising external AC power. Third relay 410 is also coupled, in some embodiments, to a DC circuit 403. In some embodiments of the invention, detection and alert device 150 comprises a third relay 410 electrically coupled to an AC circuit 402 of detection and alert device 150 and a DC circuit 403, such as the 9 volt battery terminal similar to that found in a commercially available smoke detector.

As shown in FIG. 5, detection and alert device 150 comprises third relay 410, an AC circuit 402 and a DC circuit 403. In some embodiments (not shown) detection and alert device 150 may comprise a third timed relay. A third timed relay is, however, generally not necessary because any interruption in AC power from AC current source 104 is followed by a short delay created by first timed relay 222 prior to DC power from first DC source 203 energizing dedicated circuit 122. Regardless, following interruption of AC power, third relay 410 directs DC power to DC circuit 403. Under operating conditions wherein AC power energizes dedicated circuit 102, third relay 410 directs AC power to AC circuit 402. FIG. 5 also shows dedicated circuit current 123, which comprises AC power originating at AC power source 104 (shown in FIG. 1) or DC power originating at first DC source 203, depending, as discussed extensively herein, upon whether AC power from AC power source 104 is available.

Figure 6:
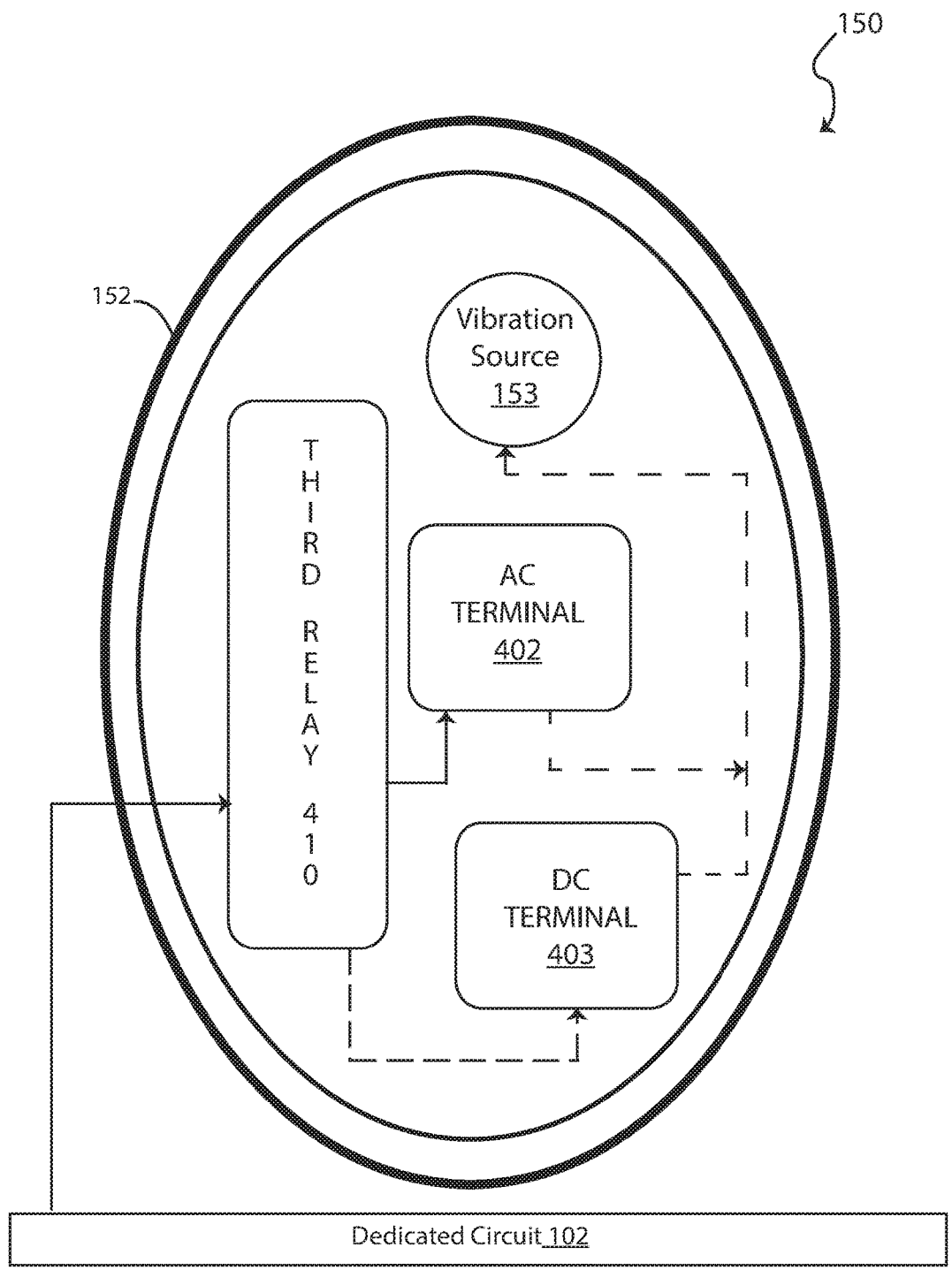
FIG. 6 is a schematic representation of an alert device 150.

FIG. 6 is a schematic representation of a detection and alert device 150. FIG. 6 shows a back plate 152 and an vibrational source 153. Vibrational source 153, in some embodiments, is a DC-powered offset motor comprising an unbalanced rotational element which, upon rotating, causes a vibration of the same frequency as the period of rotation. For example, wherein the rotational speed of an offset motor comprising vibrational source 153 is 6,000 revolutions per minute ("RPM"), the vibrational frequency is 6,000 revolutions/minute multiplied by 1 minute/60 seconds, or 100 cycles per second ("Hertz"). Relatively low-frequency vibrations, generally less than about 500 Hertz, are readily transmitted throughout the ceiling, walls, and floor of at least a single room in a building structure without significant attenuation. These vibrations are, in turn, transmitted through items of furniture on the floor or in contact with the walls of the room to a person resting on the furniture item. A hearing-impaired or other person is sensitive to these vibrations, which reliably and reproducibly tend to awaken the person from a sound sleep and alert the person to the presence of a possibly dangerous situation. Hearing-impaired persons may be more sensitive to some vibrational frequencies than others. Hearing-impaired persons generally are sensitive to vibrational frequencies of between about 100 Hertz and about 200 Hertz. Many hearing-impaired persons appear to be most sensitive to a vibrational frequency of about 120 Hertz.

Given that hearing-impaired and some other persons may detect vibrations at a frequency less than about 500 Hertz, in some embodiment, vibrational source 153 generates vibrations at a frequency of less than about 500 Hertz. In some embodiments, vibrational source 153 generates vibrations between a frequency of about 400 Hertz and about 500 Hertz. In some embodiments, vibrational source 153 generates vibrations between a frequency of about 300 Hertz and about 400 Hertz. In some embodiments, vibrational source 153 generates vibrations between a frequency of about 200 Hertz and about 300 Hertz. In some embodiments, vibrational source 153 generates vibrations between a frequency of about 100 Hertz and about 200 Hertz. In some embodiments, vibrational source 153 generates vibrations between a frequency of about 500 Hertz and about 100 Hertz. In some embodiments, vibrational source 153 generates vibrations at a frequency less than about 50 Hertz. In some embodiments, vibrational source 153 generates vibrations at a frequency of greater than about 500 Hertz.

Vibrational source 153 of alert device 150 mounted installed on a building structure, therefore, causes a vibration to be conducted through the building structure to a hearing-impaired or other person, awakening that person from sleep, in some embodiments. For example, when lying in a bed, on a sofa, or otherwise resting on or in in contact with an item of furniture which, in turn, contacts the floor or other part of a building structure, a hearing impaired person is reliably awakened from sleep under a condition wherein the building structure is caused to vibrate at a vibrational frequency of about 120 Hertz. Additionally, a hearing impaired or other person is reliably awakened from sleep if the person is in directly contact with a portion of the building structure, as in when lying on the floor or touching a wall of the building structure.

Because the relatively low frequency of vibrations generated by vibrational source 153 are readily transmitted through air as pressure waves, similar to a loud bass speaker of a home stereo or stereo installed in an automobile, a hearing impaired or other person perceives these pressure waves directly throughout the surface of the person's body, in addition to any portion of the person's body being in direct or indirect contact—such as through a furniture item—with the building structure.

Vibrational source 153, in some embodiments, is coupled to back plate 152 of alert device 150. Back plate 152, in some embodiments, is coupled to a building structure. In some embodiments, back plate 152 mounts directly to a standard commercially available electrical junction box, such as the type of junction box used to mount a light fixture, ceiling fan, or like electrical device to a ceiling of a building structure. This example is not meant to be limiting; in some embodiments, back plate 152 is mounted to an electrical junction box on a wall or any other structural element of a building. Such junction boxes are typically fastened directly to frame elements of a building, using fasteners such as by nails, screws, other fasteners, and the like. Vibrations from vibrational source 153, therefore, are transmitted through back plate 152 directly to a frame element of the building structure, which further conducts the vibration throughout a large surrounding expanse of the building structure, including the walls and floors. The building structure vibrations caused by vibrational source 153 are conducted throughout all elements of the building structure generally proximate to alert device 150, regardless of the specific building materials used, including but not limited to wood, steel, concrete, combinations of these and other materials, and the like.

FIG. 6 additionally shows AC circuit 402 and DC circuit 403 electrically coupled to third relay 410. Third relay 410 is electrically coupled to dedicated circuit 122 and electrically interposed between dedicated circuit 122 and both AC circuit 402 and DC circuit 403. AC circuit 402, in some embodiments, comprises any of many possible circuit means to modify an AC current conducted through dedicated circuit 122 to a DC current of suitable voltage to operate vibrational source 153 and additional electrical components, in some embodiments. In some embodiments, AC circuit 402 comprises a voltage transformer. In some embodiments, AC circuit 402 comprises an AC to DC rectifier. In some embodiments, AC circuit 402 is electrically coupled to vibrational source 153. In some embodiments, AC circuit 402 is electrically coupled to DC circuit 402 which, in turn, is electrically coupled to vibrational source 153. It is to be understood that many circuit configurations and electrical couplings are possible to create embodiments of alert device 150 wherein either an incoming AC from dedicated circuit 122 or a DC from dedicated circuit 122 is used, whether modified or un-modified, to power vibrational source 153.

Figure 7:
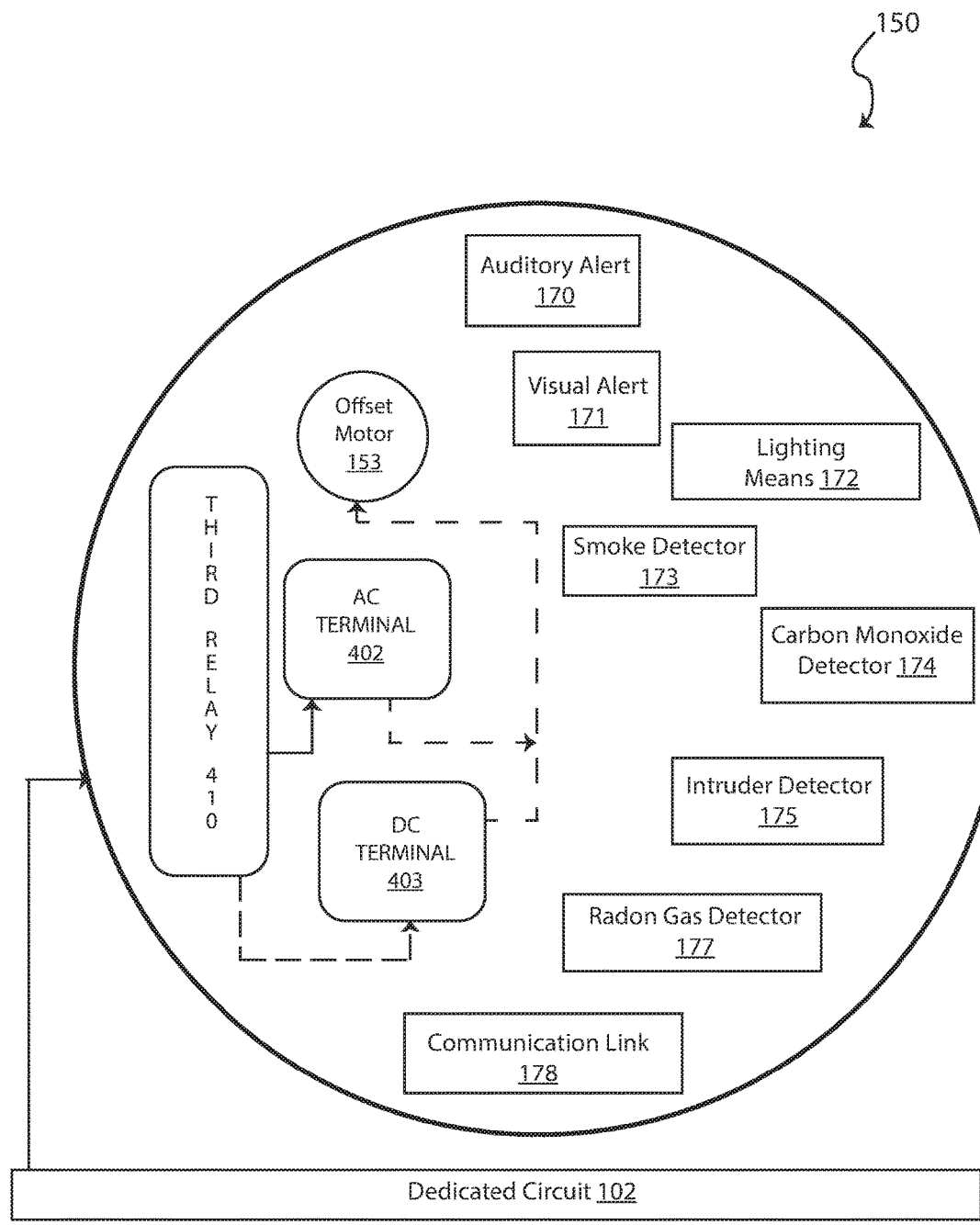
FIG. 7 is an additional schematic representation of an alert device 150.

FIG. 7 is a schematic representation of some alternative embodiments of detection and alert device 150 comprising multiple examples of possible detection and alert means. These examples are not meant to be limiting; detection and alert device 150 may comprise additional or alternative detection devices besides those examples noted in FIG. 7 and discussed herein below.

FIG. 7 shows alert device 150 comprising additional elements of battery interconnected alert device system with vibrational alert 100, present in some embodiments. In some embodiments, battery interconnected alert device system with vibrational alert 100 further comprises an emergency lighting system. The emergency lighting system is activated by DC power from first DC source 203 conducted through first relay 210 to alert device 150 following an interruption of AC power source 104, in some embodiments. In some embodiments, alert device 150 further comprises a lighting means 172. Lighting means 172 causes illumination of a space proximate to an individual alert device 150, in some embodiments. In some embodiments, lighting means 172 is part of an emergency lighting system. In some embodiments, lighting means 172 is electrically coupled to dedicated circuit 102 and is mounted in a separate location from alert device 150. Lighting means may be a light emitting diode, by way of example, or other suitable means of illumination. In some embodiments, detection and alert device 150 comprises a visual alert 171. Visual alert communicates the presence of a condition, such as an emergency condition, to a person viewing visual alert 171. Visual alert 171 is distinguished from lighting means 172 in that visual alert 171, although visible to a person in a space, does not necessarily illuminate the space, wherein lighting means 172 does illuminate the space at a sufficient level for a person present in the space to safely exit the space, if necessary. Some non-limiting examples of visual alerts include a light source, such as a light-emitting diode, which is activated with activation of detection and alert device 150. In some embodiments, visual alert 171 is a flashing light. In some embodiments, visual alert 171 flashes in a pattern synchronous with pulsed vibrations caused by vibration source 153. In some embodiments, visual alert 171 flashes in a pattern asynchronous with vibrations caused by vibration source 153.

In some embodiments, detection and alert device 150 comprises a smoke detector 173, such as a conventional smoke detection device. In some embodiments, detection and alert device 150 comprises a carbon monoxide detector 174, such as a conventional carbon monoxide detection device. In some embodiments, detection and alert device 150 comprises an intruder detector 175, such as a conventional motion detector or alternative intruder detection device. In some embodiments, detection and alert device 150 comprises a radon gas detector 177, such as a conventional radon gas detection device.

In some or all these embodiments, battery interconnected alert device system with vibrational alert 100 comprises a detection device, such as one of the aforementioned non-limiting examples of detection devices, to trigger a vibrational alert by activation of vibration source 153. Activation of vibration source 153 transmits a vibration to a building structure, as discussed herein above, and alerts a person in contact with the building structure to the existence of a possible emergency condition. Vibration source 153, in some embodiments, is coupled to the building structure through a mounting means, such as back plate 152 in some embodiments, coupling alert device 150 to the building structure. In some embodiments, alert device 150 is mounted on a conventional electrical junction box contained with a ceiling, a wall, or another component of the building structure. Vibrations arising from vibration source 153 are transmitted through alert device 150 via the mounting means to the ceiling, wall, or other building structure component throughout structural components of the building structure in physical continuity with alert device 150's location.

The effectiveness of the vibrations in waking a sleeping person is increased when the vibrations are intermittent and alternating with periods of no vibration, such as pulsed vibrations. Moreover, alert device 150, in some embodiments, uses a pattern of pulsed vibrations to communicate the nature of an emergency situation to the person, and also to communicate at least simple instructions, such as remain in the room, immediately exit the building, etc. In some embodiments, a standardized language of patterned pulsed vibrations is used to communicate the nature of an emergency. In some embodiments, the standardized language is used to communicate instructions to a person.

In some embodiments, detection and alert device 150 comprises a communication link 178. Communication link 178 activates alert device 150, in some embodiments, when instructed to do so by a government public safety warning system, such as the Public Alert and Warning System operated by the United States Department of Homeland Security, for example. In some embodiments, communication link 178 is a wireless communication link. In some embodiments, communication link 178 is a wired communication link. In some embodiments, communication link 178 is activated by the NOAA Weather Radio All Hazards alert system. In some embodiments, other federal, state, and municipal government alert systems activate alert device 150 through communication link 178.

Figure 8:
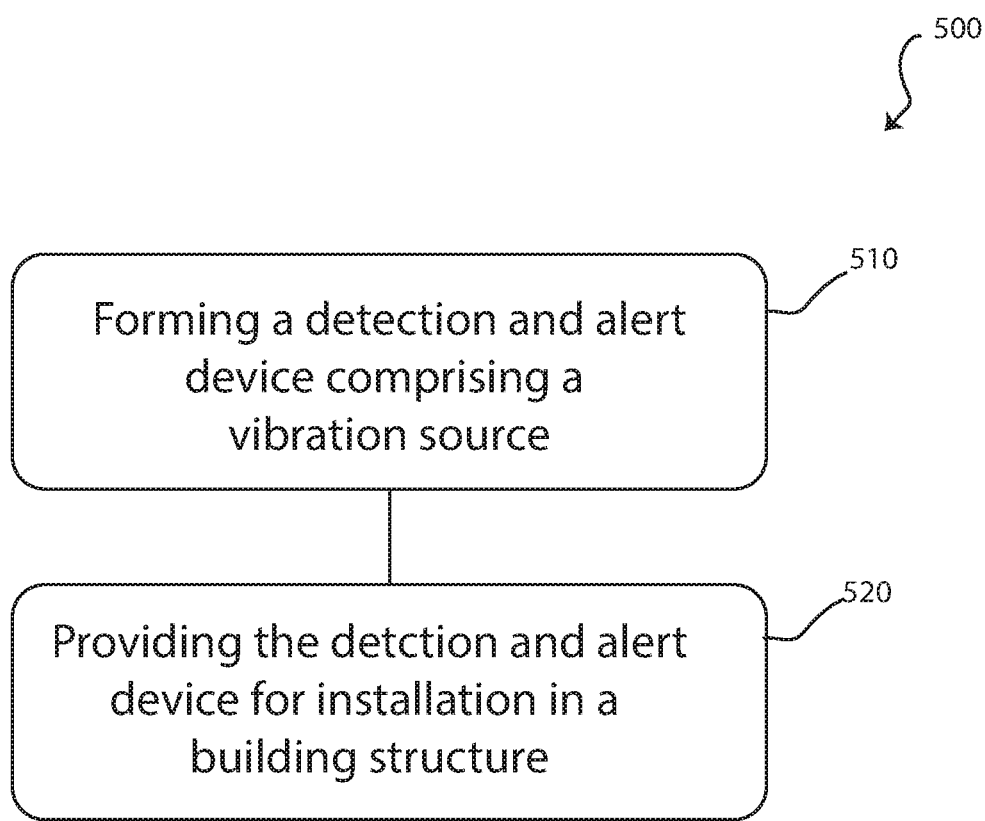
FIG. 8 is a schematic representation of a method of creating a detection and alert device system.

FIG. 8 is a schematic diagram of a method of creating a detection and alert device system. FIG. 8 shows a method 500 comprising a forming step 510 and a providing step 520.

Forming step 510 of method 500, in some embodiments, comprises forming a detection and alert device comprising a vibration source for installation into a building. In some embodiments, forming step 510 comprises forming a detection and alert device comprising a vibration source for electrically coupling to a dedicated circuit of a building. In some embodiments, the building is a residential building. In some embodiments, the building is a commercial building. In some embodiments, the vibration source causes a pulsed vibration. In some embodiments, the pulsed vibration source generates a pattern of pulsed vibrations which communicates a condition to a person perceiving the pattern of pulsed vibrations caused by the vibration source.

Providing step 520 comprises, in some embodiments, providing the detection and alert device for installation to a dedicated circuit of a building structure.

A battery interconnected alert system with vibrational alert has been described. The detection and alert system described herein provides a means for continuous, reliable DC backup of an interconnected network of alert devices in a building by locating a DC battery in a location convenient to the user, and, in some embodiments, by providing a means to continuously or intermittently recharge a rechargeable battery. It is to be understood that the embodiments of the battery interconnected alert system with vibrational alert according to the invention as shown and described is an example only and that many other embodiments of the battery interconnected alert system with vibrational alert according to the invention are possible and envisioned.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above.

The invention claimed is:

1. An alert device system comprising:
   an alert device comprising:
   a vibration source coupled to a back plate of the alert device, wherein the back plate is adapted to mount to an electrical junction box on a wall or ceiling of a building structure; and
   at least one circuit to transfer power to activate the vibration source, wherein activation of the vibration source causes vibration of the wall, the ceiling, and a floor of the building structure.

2. The alert device system of claim 1, wherein the vibration source is an offset motor.

3. The alert device system of claim 1, wherein the vibration is a pulsed vibration.

4. The alert device system of claim 1, wherein the vibration is at a frequency between about 100 Hertz and about 200 Hertz.

5. The alert device system of claim 1, wherein the vibration is at a frequency of about 120 Hertz.

6. The alert device system of claim 1, further comprising an auditory alert device.

7. The alert device system of claim 1, further comprising a visual alert device.

8. The alert device system of claim 1, further comprising an emergency lighting system.

9. The alert device system of claim 1, wherein the alert device system further comprises a detection and alert device.

10. The alert device system of claim 9, wherein the detection and alert device comprises a smoke detector.

11. The alert device system of claim 9, wherein the detection and alert device comprises a carbon monoxide detector.

12. The alert device system of claim 9, wherein the detection and alert device comprises an intruder detector.

13. The alert device system of claim 9, wherein the detection and alert device comprises a natural gas detector.

14. The alert device system of claim 9, wherein the detection and alert device comprises a radon gas detector.

15. The alert device system of claim 9, wherein the detection and alert device comprises a communication link to a government alert broadcast system.

16. A detection and alert device system comprising:
   an alert device adapted to couple to a dedicated circuit, the alert device comprising a vibration source adapted to couple to a building structure; wherein activation of the alert device causes a vibration of the building structure;
   an alternating current source;
   a first DC source located remote from the alert device in a location of the building structure;
   a first relay adapted to couple to the dedicated circuit, an alternating current source, and a direct current source located remote from the alert device in a location of the building structure, wherein the first relay is to conduct a current to the dedicated circuit by selecting between the alternating current source and the direct current source.

17. The detection and alert device system of claim 16, wherein activation of the alert device causes a person in proximity to the building structure to sense pressure waves transmitted through air in proximity to the building structure.

18. The detection and alert device system of claim 16, wherein the first direct current source is a rechargeable battery and further comprising:
   a low voltage controller electrically coupled between the rechargeable battery source and the first relay; and
   a second direct current source, wherein the low voltage controller selects a source for a charging current from a plurality of second DC sources and causes distribution of the charging current to the rechargeable battery.

19. The detection and alert device system of claim 18, further comprising:
   an alternating current to direct current transformer electrically coupled to the alternating current source and the low voltage controller, wherein the second direct current source comprises the transformer.

20. The detection and alert device system of claim 18, further comprising a plurality of detection and alert devices electrically coupled to the dedicated circuit, wherein the low voltage controller responds to one activated detection and alert device by activating the plurality of detection and alert devices.

21. The detection and alert device system of claim 18, further comprising a manually activated alarm switch electrically coupled to the dedicated circuit, wherein the low voltage controller responds to the manually activated alarm switch by activating the plurality of detection and alert devices.

22. A detection and alert device comprising:
   a case enclosing an alternating current circuit, a direct current circuit, a vibration source, and a relay, wherein the vibration source is to be coupled to a building structure through the case and wherein activation of the vibration source causes vibration of the building structure; and
   wherein the relay is to receive an external current, wherein the relay determines whether the external current is an alternating current or a direct current, and
   under a condition wherein the external current is an alternating current, routes the external current to the alternating current circuit, and
   under a condition wherein the external current is a direct current, routes the external current to the direct current circuit.

23. The detection and alert device of claim 22, wherein the external current is conducted through a dedicated circuit electrically coupled to the detection and alert device.

24. A method of creating a detection and alert device system comprising:
   forming a detection and alert device, the detection and alert device comprising a vibration source coupled to a back plate of the detection and alert device, wherein the back plate is adapted to mount to an electrical junction box on a wall or ceiling of a building structure, wherein activation of the vibration source causes a vibration of a wall, a ceiling, and a floor of the building structure; and
   providing the detection and alert device for installation to a dedicated circuit of a building structure.

25. The method of claim 24, wherein the vibration source causes a pulsed vibration.

26. The method of claim 25, wherein the pulsed vibration source generates a pattern of pulsed vibrations which communicates a condition to a person perceiving the pattern of pulsed vibrations caused by the vibration source.

* * * * *